US010636452B1

United States Patent
Yang

(10) Patent No.: US 10,636,452 B1
(45) Date of Patent: Apr. 28, 2020

(54) SYSTEM AND METHOD FOR MONITORING HARD DISKS

(71) Applicant: Shenzhen Fugui Precision Ind. Co., Ltd., Shenzhen (CN)

(72) Inventor: Rui Yang, Tianjin (CN)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 0 days.

(21) Appl. No.: 16/363,735

(22) Filed: Mar. 25, 2019

(30) Foreign Application Priority Data

Mar. 11, 2019 (CN) .......................... 2019 1 0181952

(51) Int. Cl.
  *G11B 20/10* (2006.01)
  *G11B 27/36* (2006.01)
(52) U.S. Cl.
  CPC .................................... *G11B 27/36* (2013.01)
(58) Field of Classification Search
  USPC .................. 360/31, 53, 48, 75, 77.02, 78.04
  See application file for complete search history.

(56) References Cited

U.S. PATENT DOCUMENTS

| | | | | |
|---|---|---|---|---|
| 5,903,410 A | * | 5/1999 | Blaum ............... | G11B 5/59605 360/77.08 |
| 5,917,724 A | * | 6/1999 | Brousseau ............ | G11B 19/04 360/48 |
| 7,047,438 B2 | * | 5/2006 | Smith ................ | G11B 20/1883 369/47.14 |
| 7,304,816 B2 | * | 12/2007 | Johnson ................ | G11B 19/04 360/31 |

* cited by examiner

*Primary Examiner* — Nabil Z Hindi
(74) *Attorney, Agent, or Firm* — ScienBiziP, P.C.

(57) ABSTRACT

A system and method for monitoring hard disks includes a displaying unit, a hard disk controlling unit, and a complex programmable logic device (CPLD). The displaying unit displays status of hard disks. The hard disk controlling unit obtains statuses and outputs information as to status. The CPLD decodes the status information and determines whether the status of a hard disk is predictive failure analysis (PFA) according to the decoded signal. The CPLD controls the displaying unit to output PFA warning and delays other status displays for priority of the PFA. A method for monitoring is also provided.

16 Claims, 4 Drawing Sheets

SYSTEM AND METHOD FOR MONITORING HARD DISKS

FIELD

The subject matter herein generally relates to hard disk operation.

BACKGROUND

A complex programmable logic device (CPLD) displays the statuses of several hard disks by parsing the serial general purpose input output (SGPIO) signal output from a hard disk manager. Currently, the fault-existing status of the hard disk and the warning status are not distinguishable from each other, resulting in a confusing display of the hard disk statuses.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
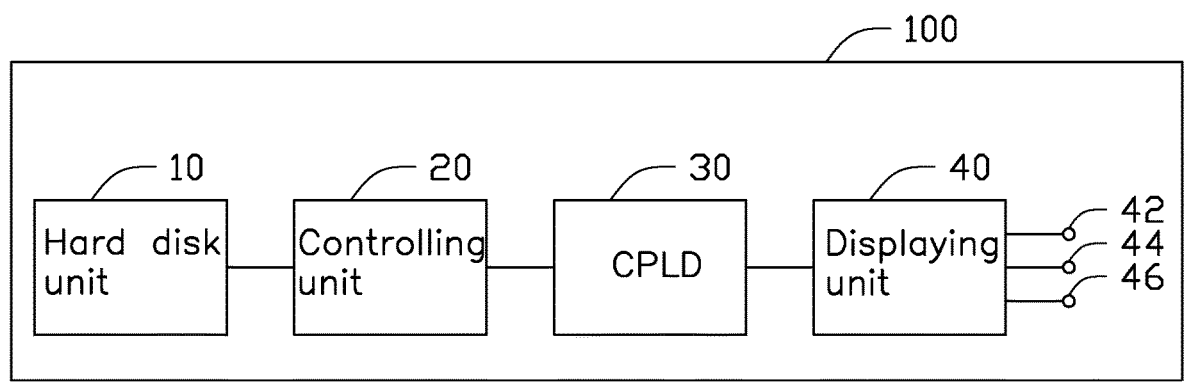
FIG. 1 is a schematic diagram of an embodiment of a system for monitoring hard disk.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a system for monitoring hard disk (system 100) in accordance with an embodiment of the present disclosure.

The system 100 includes a hard disk unit 10, a hard disk controlling unit 20, a complex programmable logic device (CPLD 30), and a displaying unit 40.

The hard disk unit 10 includes a plurality of hard disks 12. The hard disk controlling unit 20 communicates with the hard disk unit 10. In an embodiment, the hard disk controlling unit 20 can be a host bus adapter (HBA).

The hard disk controlling unit 20 detects status of the hard disks 12, and outputs status information. In an embodiment, the hard disk status can include active status, fault status, predictive failure analysis (PFA) status, rebuilding status, and location status. The status information includes active information, location information, and fault information.

The CPLD 30 is electrically coupled between the hard disk controlling unit 20 and displaying unit 40. The hard disk controlling unit 20 communicates with CPLD 30 through serial general purpose input output (SGPIO). The hard disk status information conforms to the SGPIO protocol, that is, the SGPIO signal gives status information.

The CPLD 30 receives the hard disk status information and determines the hard disk status of the hard disk 12, and controls the displaying unit 40 to display accordingly.

Figure 2:
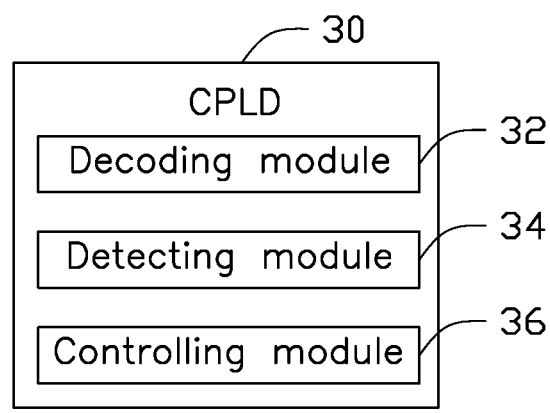
FIG. 2 is a schematic diagram of an embodiment of a complex programmable logic device (CPLD) in the system of FIG. 1.

FIG. 2 illustrates that the CPLD 30 includes a decoding module 32, a detecting module 34, and a controlling module 36.

The decoding module 32 receives the hard disk status information from the hard disk controlling unit 20, and decodes the hard disk status information to obtain decoded signal.

In an embodiment, the decoded signal includes active signal, location signal, and fault signal. The active signal, the location signal, and the fault signal respectively includes the active information, the location information, and the fault information that are being continuously performed by the hard disk 12.

The decoding module 32 transmits the active signal to the controlling module 36. The decoding module 32 transmits the location signal and the fault signal to the detecting module 34.

The detecting module 34 determines whether the hard disk status of the hard disk 12 is the PFA status according to the fault signal, and outputs enable signal. The detecting module 34 delays the fault signal and the location signal to obtain delayed signal in both cases.

When the detecting module 34 detects that the fault signal alternates between a high level and a low level in a period of time T, it determines that the hard disk status of the hard disk 12 is the PFA, and the enable signal is at a high level. When the detecting module 34 detects that the fault signal continues to be at the high level, it determines that the status of the hard disk 12 is a non-PFA status, and the enable signal is at a low level.

The detecting module 34 delays the rising edge of the location signal and the fault signal by a time period DT to obtain the delayed location signal and the delayed fault signal. In an embodiment, the time DT is between 0.5 T and T, and the time DT is 300 milliseconds (ms).

The controlling module 36 receives the enable signal, the active signal, the delayed location signal and the delayed fault signal, and controls the displaying unit 40 to output display.

The displaying unit 40 includes a plurality of first indicator lights 42, a plurality of second indicator lights 44, and a plurality of third indicator lights 46.

The first indicator lights 42 display the fault status, the PFA status, and the rebuilding status of each hard disk 12. The second indicator lights 44 display the location status of each hard disk 12, and the third indicator lights 46 display the active status of each hard disk 12.

The controlling module 36 determines whether the enable signal is at the high level or the low level. When the enable signal is at the high level, the controlling module 36 controls the displaying unit 40 to output first display information, to indicate the status of the hard disk 12 as PFA. In an embodiment, the first display information is the first indicator light 42 flashing twice at a frequency of 4 Hz, each interval being 0.5 second.

The controlling module 36 determines whether the location signal is at the high or low level. When the location signal is at the high level, the controlling module 36 controls the displaying unit 40 to output second display information, to indicate the status of the hard disk 12 as the location status. In an embodiment, the second indicator light 44 flashes at the frequency of 4 Hz. When the location signal is at the low level, the controlling module 36 controls the displaying unit 40 to show no second display information, the second indicator lights 44 are extinguished.

When the enable signal is at the high level, since the rising edge of the fault signal and the location signal are delayed by DT time, this avoids the fault signal and the location signal being simultaneously at the high level.

When the enable signal is at the low level, the controlling module 36 controls the displaying unit 40 to output display information of the hard disks 12 according to the level value of the active signal, the delayed location signal, and the delayed fault signal.

In the embodiment, when the active signal is at the high level, the controlling module 36 controls the displaying unit 40 to output third display information, to indicate the status of the hard disks 12 as the active status. The third indicator lights 46 flash at the frequency of 4 Hz.

When the fault signal is at the high level and the location signal is at the low level, the controlling module 36 controls the displaying unit 40 to output fourth display information, to indicate the status of the hard disks 12 as the fault status, and the first indicator light 42 is turned on.

When the fault signal is at the low level and the location signal is at the high level, the controlling module 36 controls the displaying unit 40 to output fifth display information, to indicate the status of the hard disk 12 as the location status. The second indicator lights 44 flash at the frequency of 4 Hz.

When both the fault signal and the location signal are at the high level, the controlling module 36 controls the displaying unit 40 to output sixth display information, to indicate the status of the hard disk 12 as the rebuilding status. The first indicator lights 42 flash at the frequency of 1 Hz.

Figure 3:
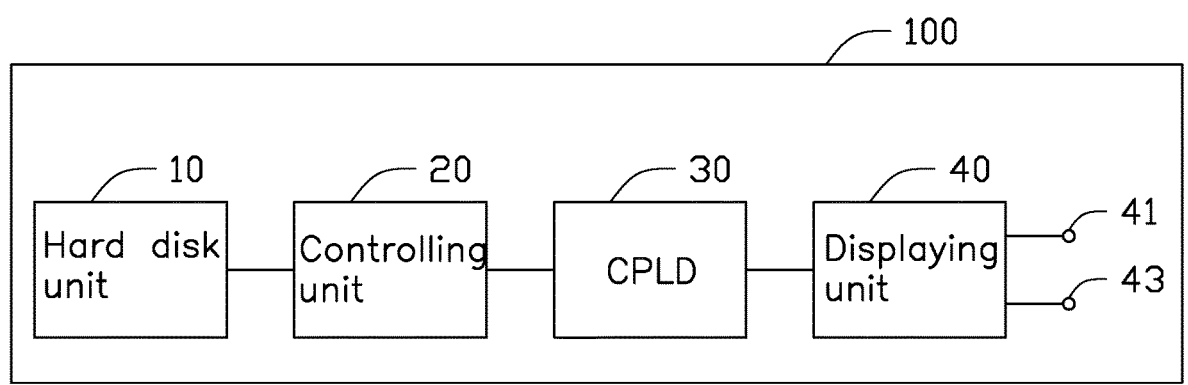
FIG. 3 is a schematic diagram of another embodiment of a monitoring system.

FIG. 3 illustrates that the displaying unit 40 includes a plurality of fourth indicator lights 41 and a plurality of fifth indicator lights 43 in another embodiment of the present disclosure.

One of the fourth indicator light 41 and one of the fifth indicator light 43 correspond to one hard disk 12.

The fault status, the PFA status, and the rebuilding status of the hard disk 12 are displayed by the fourth indicator lights 41, the location status is displayed by the fourth indicator lights 41 and the fifth indicator lights 43, and the active status is displayed by the fifth indicator lights 43.

When the active signal is at the high level, the controlling module 36 controls the displaying unit 40 to output seventh display information, and the fifth indicator lights 43 flash at the frequency of 4 Hz.

When the fault signal is at the high level and the location signal is at the low level, the controlling module 36 controls the displaying unit 40 to output an eighth display information, and the fourth indicator light 41 is turned on.

When the fault signal is at the low level and the location signal is at the high level, the controlling module 36 controls the displaying unit 40 to output ninth display information. Both the fourth indicator lights 41 and the fifth indicator lights 43 flash at the frequency of 4 Hz.

When both the fault signal and the location signal are at the high level, the controlling module 36 controls the displaying unit 40 to output tenth display information. The fourth indicator lights 41 flash at the frequency of 1 Hz.

When the status of the hard disk 12 is PFA status, the controlling module 36 controls the displaying unit 40 to output the eleventh display information, thus the fourth indicator lights 41 flash twice at a frequency of 4 Hz, and each interval is 0.5 seconds.

Figure 4:
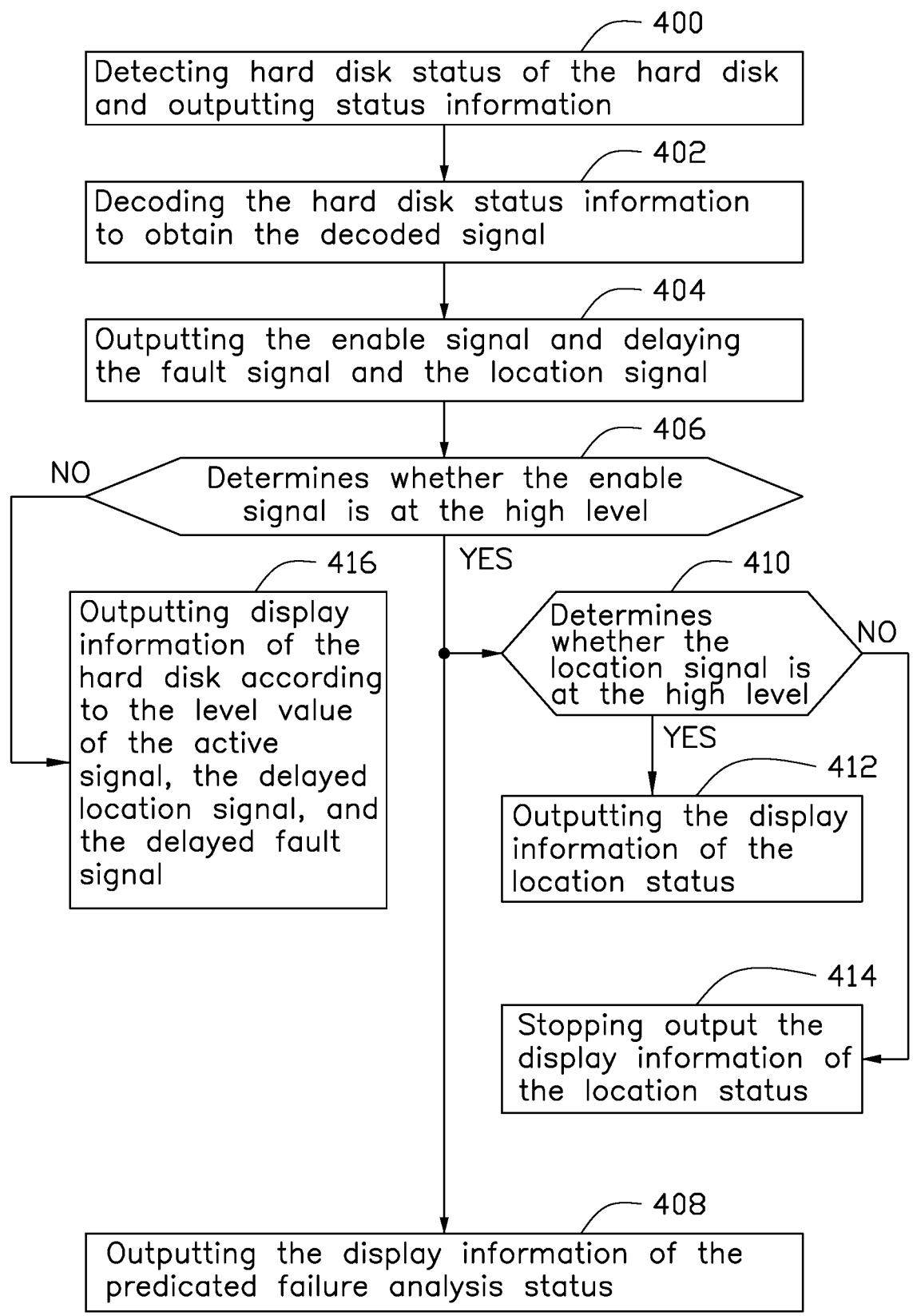
FIG. 4 is a flow diagram of an embodiment of a method for monitoring hard disk.

FIG. 4 is a flowchart depicting an embodiment of a method for monitoring hard disk. The method is provided by way of example, as there are a variety of ways to carry out the method. The method described below can be carried out using the configurations illustrated in FIGS. 1-3 for example, and various elements of these figures are referenced in explaining the example method. Each block shown in FIG. 4 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 400.

At block 400, the hard disk controlling unit 20 detects status of the hard disk 12, and outputs status information. In an embodiment, the status can include active status, fault status, predictive failure analysis (PFA) status, rebuilding status, and location status. The status information includes active information, location information, and fault information.

The CPLD 30 is electrically coupled between the hard disk controlling unit 20 and displaying unit 40. The hard disk controlling unit 20 communicates with CPLD 30 through serial general purpose input output (SGPIO). The hard disk status information conforms to the SGPIO protocol, that is, the SGPIO signal gives status information.

At block 402, the decoding module 32 receives the status information from the hard disk controlling unit 20, and decodes the hard disk status information to obtain the decoded signal.

In an embodiment, the decoded signal includes active signal, location signal, and fault signal. The active signal, the location signal, and the fault signal respectively includes the active information, the location information, and the fault information that are being continuously performed by the hard disk 12.

At block 404, the detecting module 34 determines whether the status of the hard disk 12 is the PFA status according to the fault signal, and outputs enable signal. The detecting module 34 delays the fault signal and the location signal to obtain delayed signal in both cases.

When the detecting module 34 detects that the fault signal alternates between a high level and a low level in a period of time T, it determines that the hard disk status of the hard disk 12 is the PFA status, and the enable signal is at the high level. When the detecting module 34 detects that the fault signal continues to be at the high level, it determines that the hard disk status of the hard disk 12 is a non-PFA status, and the enable signal is at a low level.

The detecting module 34 delays the rising edge of the location signal and the fault signal by a time period DT to obtain the delayed location signal and the delayed fault signal. In an embodiment, the time DT is between 0.5 T and T, and the time DT is 300 milliseconds (ms).

At block 406, the controlling module 36 determines whether the enable signal is at the high level. If the enable signal is at the high level, block 408 and block 410 is implemented, otherwise block 416 is implemented.

At block 408, the controlling module 36 controls the displaying unit 40 to output first display, to indicate the status of the hard disk 12 as the PFA status. In an embodiment, the first display is the first indicator light 42 flashing twice at a frequency of 4 Hz, and each interval being 0.5 second.

At block 410, the controlling module 36 determines whether the location signal is at the high level. If the location signal is at the high level, block 412 is implemented, otherwise block 414 is implemented.

At block 412, the controlling module 36 controls the displaying unit 40 to output second display, to indicate the status of the hard disk 12 as the location status. In an embodiment, the second indicator light 44 flashing at the frequency of 4 Hz.

At block 414, the controlling module 36 controls the displaying unit 40 not to output second display, and the second indicator lights 44 are extinguished.

When the enable signal is at the high level, since the rising edge of the fault signal and the location signal is delayed by a period of time DT, the fault signal and the location signal are simultaneously at the high level can be avoided.

At block 416, the controlling module 36 controls the displaying unit 40 to output display of the hard disk 12 according to the level value of the active signal, the delayed location signal, and the delayed fault signal.

In the embodiment, when the active signal is at the high level, the controlling module 36 controls the displaying unit 40 to output third display, to indicate the status of the hard disk 12 as the active status. The third indicator lights 46 flashing at the frequency of 4 Hz.

When the fault signal is at the high level and the location signal is at the low level, the controlling module 36 controls the displaying unit 40 to output fourth display, to indicate the status of the hard disk 12 as the fault status, and the first indicator light 42 is turned on.

When the fault signal is at the low level and the location signal is at the high level, the controlling module 36 controls the displaying unit 40 to output fifth display, to indicate the status of the hard disk 12 as the location status. The second indicator light 44 flashing at the frequency of 4 Hz.

When both the fault signal and the location signal are at the high level, the controlling module 36 controls the displaying unit 40 to output sixth display, to indicate the status of the hard disk 12 as the rebuilding status. The first indicator lights 42 flashing at the frequency of 1 Hz.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A monitoring method for hard disk, comprising:
    obtaining status of a hard disk and outputting status information;
    receiving the status information and decoding the status information to obtain decoded signal;
    determining whether the status of the hard disk is predicative failure analysis (PFA) status instantaneously according to the decoded signal; and
    outputting warning information of the PFA status when the status of the hard disk is the PFA status;
    outputting display of the hard disk when the status of the hard disk is not the PFA status.

2. The monitoring method of claim 1, wherein the decoded signal comprises active signal, location signal, and fault signal.

3. The monitoring method of claim 2, wherein further comprising:
    outputting enable signal according to the fault signal; and
    delaying the location signal and the fault signal to obtain delayed location signal and delayed fault signal.

4. The monitoring method of claim 3, wherein further comprising:
    determining whether the enable signal is at a high level; and
    outputting the display of the hard disk according to the determination result.

5. The monitoring method of claim 4, wherein further comprising:
    outputting the warning information when the enable signal is at the high level; and
    outputting the display of the hard disk according to the level value of the active signal, the delayed location signal, and the delayed fault signal.

6. The monitoring method of claim 5, wherein further comprising:
    determining whether the location signal is at the high level; and
    outputting display of location status when the location signal is at the high level.

7. The monitoring method of claim 5, wherein further comprising:
    stopping output display of the location status when the location signal is at a low level.

8. A monitoring system for hard disk, comprising:
    a displaying unit displaying status of a hard disk;
    a hard disk controlling unit coupling to the hard disk; wherein the hard disk controlling unit obtains the status of the hard disk and outputs status information;
    a complex programmable logic device (CPLD) coupling between the hard disk controlling unit and the displaying unit; wherein the CPLD decodes the status information to obtain decoded signal, and determines whether the status of the hard disk is predicative failure analysis (PFA) status according to the decoded signal;
    wherein the CPLD controls the displaying unit to output warning information of the PFA status when the status of the hard disk is the PFA status.

9. The monitoring system of claim 8, wherein the CPLD controls the displaying unit to output display of the hard disk when the status of the hard disk does not the PFA status.

10. The monitoring system of claim 9, wherein the CPLD comprises a decoding module, the decoding module receives the status information, and decodes the status information to obtain the decoded signal.

11. The monitoring system of claim 10, wherein the decoded signal comprises active signal, location signal, and fault signal.

12. The monitoring system of claim 11, wherein the CPLD comprises a detecting module, the detecting module outputs enable signal according to the fault signal, and delays the location signal and the fault signal to obtain delayed location signal, and delayed fault signal.

13. The monitoring system of claim hard disk 12, wherein the CPLD comprises a controlling module, the controlling module determines whether the enable signal is at a high level, and outputs the display of the hard disk according to the determination result.

14. The monitoring system of claim 13, wherein the controlling module controls the displaying unit to output the warning information when the enable signal is at the high level.

15. The monitoring system of claim 14, wherein the controlling module controls the displaying unit to output the display of the hard disk according to the level value of the active signal, the delayed location signal, and the delayed fault signal when the enable signal is at the low level.

16. The monitoring system of claim 15, wherein the controlling module determines whether the location signal is at the high level, and controls the displaying unit to output display information of location status when the location signal is at the high level.

* * * * *